United States Patent
Hanson et al.

(10) Patent No.: US 10,291,295 B2
(45) Date of Patent: *May 14, 2019

(54) SELECTIVELY COMBINING UPLINK SIGNALS IN DISTRIBUTED ANTENNA SYSTEMS

(71) Applicant: CommScope Technologies LLC, Hickory, NC (US)

(72) Inventors: Van E. Hanson, Forest, VA (US); Christopher Goodman Ranson, Concord, VA (US)

(73) Assignee: CommScope Technologies LLC, Hickory, NC (US)

(*) Notice: Subject to any disclaimer, the term of this patent is extended or adjusted under 35 U.S.C. 154(b) by 114 days.

This patent is subject to a terminal disclaimer.

(21) Appl. No.: 15/437,032

(22) Filed: Feb. 20, 2017

(65) Prior Publication Data

US 2017/0163316 A1 Jun. 8, 2017

Related U.S. Application Data

(63) Continuation of application No. 14/624,195, filed on Feb. 17, 2015, now Pat. No. 9,577,922.

(Continued)

(51) Int. Cl.
*H04B 1/10* (2006.01)
*H04B 7/08* (2006.01)
(Continued)

(52) U.S. Cl.
CPC ........... *H04B 7/024* (2013.01); *H04B 1/1027* (2013.01); *H04B 7/0817* (2013.01);
(Continued)

(58) Field of Classification Search
CPC .... H04B 7/024; H04B 7/0885; H04B 7/0888; H04B 7/2606; H04B 10/25753; H04L 45/245; H04W 88/085; H04W 28/06
See application file for complete search history.

(56) References Cited

U.S. PATENT DOCUMENTS

| | | |
|---|---|---|
| 4,144,409 A | 3/1979 | Utano et al. |
| 4,144,411 A | 3/1979 | Frenkiel |

(Continued)

FOREIGN PATENT DOCUMENTS

| | | |
|---|---|---|
| CA | 2008900 | 1/1998 |
| EP | 0166885 | 1/1986 |

(Continued)

OTHER PUBLICATIONS

US Patent Office, "Notice of Allowance", "from U.S. Appl. No. 12/467,924", dated Jan. 27, 2011, pp. 1-9, Publishes in: US.

(Continued)

*Primary Examiner* — Brian T O Connor
(74) *Attorney, Agent, or Firm* — Fogg & Powers LLC

(57) ABSTRACT

Certain aspects involve selectively combining uplink transmissions in a distributed antenna system ("DAS"). For example, a unit of the DAS can receive baseband uplink transmissions from remote units of the DAS via a first channel and a second channel. The unit can generate a first combined uplink signal by combining baseband uplink transmissions received from a first subset of the remote units via the first channel that include data for transmission to a base station. The unit can generate a second combined uplink signal that includes baseband uplink transmissions received from a second subset of the remote units via the second channel and excludes or attenuates baseband uplink transmissions that are received from the first subset of the remote units via the second channel and that lack data for transmission to the base station are excluded or attenuated. The unit can transmit the combined uplink signals to the base station.

13 Claims, 5 Drawing Sheets

Related U.S. Application Data

(60) Provisional application No. 61/941,272, filed on Feb. 18, 2014.

(51) Int. Cl.
*H04B 7/024* (2017.01)
*H04W 72/04* (2009.01)
*H04L 12/709* (2013.01)

(52) U.S. Cl.
CPC ......... *H04B 7/0857* (2013.01); *H04B 7/0885* (2013.01); *H04B 7/0888* (2013.01); *H04L 45/245* (2013.01); *H04W 72/0453* (2013.01)

(56) References Cited

U.S. PATENT DOCUMENTS

| | | |
|---|---|---|
| 4,183,054 A | 1/1980 | Patisaul et al. |
| 4,231,116 A | 10/1980 | Sekiguchi et al. |
| 4,451,699 A | 5/1984 | Gruenberg |
| 4,451,916 A | 5/1984 | Casper et al. |
| 4,456,793 A | 6/1984 | Baker et al. |
| 4,475,010 A | 10/1984 | Huensch et al. |
| 4,485,486 A | 11/1984 | Webb et al. |
| 4,525,861 A | 6/1985 | Freeburg |
| 4,556,760 A | 12/1985 | Goldman |
| 4,596,051 A | 6/1986 | Feldman |
| 4,611,323 A | 9/1986 | Hessenmuller |
| 4,612,990 A | 9/1986 | Shu |
| 4,613,990 A | 9/1986 | Halpern |
| 4,628,501 A | 12/1986 | Loscoe |
| 4,654,843 A | 3/1987 | Roza et al. |
| 4,667,319 A | 5/1987 | Chum |
| 4,669,107 A | 5/1987 | Eriksson-Lennartsson |
| 4,691,292 A | 9/1987 | Rothweiler |
| 4,726,644 A | 2/1988 | Mathis |
| 4,759,051 A | 7/1988 | Han |
| 4,760,573 A | 7/1988 | Calvignac et al. |
| 4,790,000 A | 12/1988 | Kinoshita |
| 4,797,947 A | 1/1989 | Labedz |
| 4,831,662 A | 5/1989 | Kuhn |
| 4,849,963 A | 7/1989 | Kawano et al. |
| 4,916,460 A | 4/1990 | Powell |
| 4,932,049 A | 6/1990 | Lee |
| 4,977,593 A | 12/1990 | Ballance |
| 5,067,147 A | 11/1991 | Lee |
| 5,067,173 A | 11/1991 | Gordon et al. |
| 5,084,869 A | 1/1992 | Russell |
| 5,159,479 A | 10/1992 | Takagi |
| 5,175,867 A | 12/1992 | Wejke et al. |
| 5,193,109 A | 3/1993 | Lee |
| 5,243,598 A | 9/1993 | Lee |
| 5,251,053 A | 10/1993 | Heidemann |
| 5,267,261 A | 11/1993 | Blakeney, II et al. |
| 5,278,690 A | 1/1994 | Vella-Coleiro |
| 5,280,472 A | 1/1994 | Gilhousen et al. |
| 5,285,469 A | 2/1994 | Vanderpool |
| 5,297,193 A | 3/1994 | Bouix et al. |
| 5,299,168 A | 3/1994 | Kang |
| 5,301,056 A | 4/1994 | O'Neill |
| 5,303,287 A | 4/1994 | Laborde |
| 5,305,308 A | 4/1994 | English et al. |
| 5,309,474 A | 5/1994 | Gilhousen et al. |
| 5,313,461 A | 5/1994 | Ahl et al. |
| 5,321,736 A | 6/1994 | Beasley |
| 5,321,849 A | 6/1994 | Lemson |
| 5,339,184 A | 8/1994 | Tang |
| 5,381,459 A | 1/1995 | Lappington |
| 5,392,453 A | 2/1995 | Gudmundson et al. |
| 5,400,391 A | 3/1995 | Mura et al. |
| 5,442,700 A | 8/1995 | Snell et al. |
| 5,457,557 A | 10/1995 | Zarem et al. |
| 5,461,627 A | 10/1995 | Rypinski |
| 5,519,691 A | 5/1996 | Darcie et al. |
| 5,552,920 A | 9/1996 | Glynn |
| 5,566,168 A | 10/1996 | Dent |
| 5,586,121 A | 12/1996 | Moura et al. |
| 5,587,734 A | 12/1996 | Lauder et al. |
| 5,592,470 A | 1/1997 | Rudrapatna et al. |
| 5,603,060 A | 2/1997 | Weinberger et al. |
| 5,603,080 A | 2/1997 | Kallander et al. |
| 5,621,786 A | 4/1997 | Fischer et al. |
| 5,627,879 A | 5/1997 | Russell et al. |
| 5,630,204 A | 5/1997 | Hylton et al. |
| 5,642,405 A | 6/1997 | Fischer et al. |
| 5,644,622 A | 7/1997 | Russell et al. |
| 5,657,374 A | 8/1997 | Russell et al. |
| 5,682,256 A | 10/1997 | Motley et al. |
| 5,724,385 A | 3/1998 | Levin et al. |
| 5,732,076 A | 3/1998 | Ketseoglou et al. |
| 5,752,170 A | 5/1998 | Clifford |
| 5,761,619 A | 6/1998 | Danne et al. |
| 5,765,097 A | 6/1998 | Dail |
| 5,765,099 A | 6/1998 | Georges et al. |
| 5,774,085 A | 6/1998 | Yanagimoto et al. |
| 5,774,660 A | 6/1998 | Brendel et al. |
| 5,774,789 A | 6/1998 | van der Kaay et al. |
| 5,781,541 A | 7/1998 | Schneider |
| 5,781,859 A | 7/1998 | Beasley |
| 5,781,865 A | 7/1998 | Gammon |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,822,324 A | 10/1998 | Kostresti et al. |
| 5,852,651 A | 12/1998 | Fischer et al. |
| 5,874,914 A | 2/1999 | Krasner |
| 5,878,325 A | 3/1999 | Dail |
| 5,907,544 A | 5/1999 | Rypinski |
| 5,946,622 A | 8/1999 | Bojeryd |
| 5,969,837 A | 10/1999 | Farber et al. |
| 5,987,014 A | 11/1999 | Magill et al. |
| 6,005,884 A | 12/1999 | Cook et al. |
| 6,034,950 A | 3/2000 | Sauer et al. |
| 6,061,089 A | 5/2000 | Tonkin et al. |
| 6,108,113 A | 8/2000 | Fee |
| 6,108,550 A | 8/2000 | Wiorek et al. |
| 6,108,626 A | 8/2000 | Cellario et al. |
| 6,112,086 A | 8/2000 | Ivala |
| 6,122,529 A | 9/2000 | Sabat, Jr. et al. |
| 6,128,470 A | 10/2000 | Naidu et al. |
| 6,147,786 A | 11/2000 | Pan |
| 6,150,993 A | 11/2000 | Dobrovolny |
| 6,157,659 A | 12/2000 | Bird |
| 6,188,693 B1 | 2/2001 | Murakami |
| 6,198,558 B1 | 3/2001 | Graves et al. |
| 6,222,660 B1 | 4/2001 | Traa |
| 6,223,021 B1 | 4/2001 | Silvia et al. |
| 6,226,274 B1 | 5/2001 | Reese et al. |
| 6,259,910 B1 | 7/2001 | Fairfield et al. |
| 6,263,135 B1 | 7/2001 | Wade |
| 6,298,246 B1 | 10/2001 | Lysejko et al. |
| 6,308,085 B1 | 10/2001 | Shoki |
| 6,336,042 B1 | 1/2002 | Dawson |
| 6,337,754 B1 | 1/2002 | Imajo |
| 6,349,200 B1 | 2/2002 | Sabat, Jr. et al. |
| 6,362,908 B1 | 3/2002 | Kimbrough et al. |
| 6,373,887 B1 | 4/2002 | Aiyagari et al. |
| 6,374,124 B1 | 4/2002 | Slabinski |
| 6,377,640 B2 | 4/2002 | Trans |
| 6,396,908 B1 | 5/2002 | O'Donovan et al. |
| 6,442,405 B1 | 8/2002 | Hiramatsu et al. |
| 6,463,301 B1 | 10/2002 | Bevan |
| 6,480,702 B1 | 11/2002 | Sabat, Jr. |
| 6,486,907 B1 | 11/2002 | Farber et al. |
| 6,496,290 B1 | 12/2002 | Lee |
| 6,498,936 B1 | 12/2002 | Raith |
| 6,535,720 B1 | 3/2003 | Kintis et al. |
| 6,567,473 B1 | 5/2003 | Tzannes |
| 6,580,905 B1 | 6/2003 | Naidu et al. |
| 6,622,013 B1 | 9/2003 | Miyoshi et al. |
| 6,643,498 B1 | 11/2003 | Miyajima |
| 6,667,973 B1 | 12/2003 | Gorshe et al. |
| 6,674,966 B1 | 1/2004 | Koonen |
| 6,704,545 B1 | 3/2004 | Wala |
| 6,729,929 B1 | 5/2004 | Sayers et al. |

(56) References Cited

U.S. PATENT DOCUMENTS

| | | | |
|---|---|---|---|
| 6,738,581 B2 | 5/2004 | Handelman |
| 6,768,745 B1 | 7/2004 | Gorshe et al. |
| 6,785,558 B1 | 8/2004 | Stratford et al. |
| 6,799,020 B1 | 9/2004 | Heidmann et al. |
| 6,801,767 B1 | 10/2004 | Schwartz et al. |
| 6,807,374 B1 | 10/2004 | Imajo |
| 6,826,163 B2 | 11/2004 | Mani et al. |
| 6,826,164 B2 | 11/2004 | Mani et al. |
| 6,831,901 B2 | 12/2004 | Millar |
| 6,865,390 B2 | 3/2005 | Goss et al. |
| 6,907,048 B1 | 6/2005 | Treadaway et al. |
| 6,917,614 B1 | 7/2005 | Laubach et al. |
| 6,967,937 B1 | 11/2005 | Gormley |
| 6,980,831 B2 | 12/2005 | Matsuyoshi et al. |
| 7,035,671 B2 | 4/2006 | Solum |
| 7,047,313 B1 | 5/2006 | Broerman |
| 7,103,279 B1 | 9/2006 | Koh et al. |
| 7,103,377 B2 * | 9/2006 | Bauman ............... H04W 52/42 |
| | | | 455/127.2 |
| 7,127,175 B2 | 10/2006 | Mani et al. |
| 7,171,244 B2 | 1/2007 | Bauman |
| 7,184,728 B2 | 2/2007 | Solum |
| 7,205,864 B2 | 4/2007 | Schultz, Jr. et al. |
| 7,215,651 B2 | 5/2007 | Millar |
| 7,289,972 B2 | 10/2007 | Riesler et al. |
| 7,313,415 B2 | 12/2007 | Wake et al. |
| 7,505,747 B2 | 3/2009 | Solum |
| 7,512,419 B2 | 3/2009 | Solum |
| 7,539,509 B2 * | 5/2009 | Bauman ............... H04W 52/42 |
| | | | 455/127.2 |
| 7,546,138 B2 | 6/2009 | Bauman |
| 7,610,046 B2 | 10/2009 | Wala |
| 7,639,982 B2 | 12/2009 | Wala |
| 7,848,747 B2 | 12/2010 | Wala |
| 7,917,177 B2 | 3/2011 | Bauman |
| 7,961,689 B2 | 6/2011 | Stratford |
| 7,962,111 B2 | 6/2011 | Solum |
| 8,116,805 B2 | 2/2012 | Das et al. |
| 8,270,387 B2 | 9/2012 | Cannon et al. |
| 8,306,541 B2 | 11/2012 | Laroia et al. |
| 8,326,218 B2 | 12/2012 | Nala |
| 8,346,091 B2 * | 1/2013 | Kummetz ............ H04W 88/085 |
| | | | 398/115 |
| 8,457,055 B2 | 6/2013 | Kawamura et al. |
| 8,472,868 B2 | 6/2013 | Mu et al. |
| 8,577,286 B2 | 11/2013 | Wala |
| 8,681,917 B2 | 3/2014 | McAllister et al. |
| 8,693,945 B2 | 4/2014 | Kummetz |
| 8,737,300 B2 | 5/2014 | Stapleton et al. |
| 8,737,454 B2 | 5/2014 | Wala et al. |
| 8,744,504 B2 | 6/2014 | Faccin et al. |
| 8,948,155 B2 | 2/2015 | Cannon et al. |
| 8,958,789 B2 | 2/2015 | Bauman et al. |
| 9,014,256 B2 * | 4/2015 | Ranson ................. H04B 7/022 |
| | | | 375/240 |
| 9,191,993 B2 | 11/2015 | Wala |
| 9,197,358 B2 | 11/2015 | Hejazi et al. |
| 9,276,656 B2 | 3/2016 | Oren et al. |
| 9,577,922 B2 * | 2/2017 | Hanson ................. H04L 45/245 |
| 9,602,176 B2 * | 3/2017 | Schmid ................ H04B 1/0096 |
| 9,750,082 B2 * | 8/2017 | Zavadsky ............ H04W 88/085 |
| 9,800,369 B2 * | 10/2017 | Ranson ................. H04B 7/022 |
| 9,826,410 B2 * | 11/2017 | Kummetz ............ H04W 88/085 |
| 2001/0031014 A1 | 10/2001 | Subramanian et al. |
| 2002/0003645 A1 | 1/2002 | Kim et al. |
| 2002/0072329 A1 | 6/2002 | Bandeira et al. |
| 2002/0167954 A1 | 11/2002 | Highsmith et al. |
| 2002/0191565 A1 | 12/2002 | Mani et al. |
| 2003/0015943 A1 | 1/2003 | Kim et al. |
| 2003/0043928 A1 | 3/2003 | Ling et al. |
| 2003/0133182 A1 | 7/2003 | Ng et al. |
| 2003/0143947 A1 | 7/2003 | Lyu |
| 2003/0162516 A1 | 8/2003 | Solum |
| 2004/0010609 A1 | 1/2004 | Vilander et al. |
| 2004/0037565 A1 | 2/2004 | Young et al. |
| 2004/0198453 A1 | 10/2004 | Cutrer et al. |
| 2004/0203339 A1 | 10/2004 | Bauman |
| 2004/0219950 A1 | 11/2004 | Pallonen et al. |
| 2005/0007993 A1 | 1/2005 | Chambers et al. |
| 2005/0147067 A1 | 7/2005 | Mani et al. |
| 2005/0201323 A1 | 9/2005 | Mani et al. |
| 2005/0243785 A1 | 11/2005 | Sabat, Jr. et al. |
| 2005/0250503 A1 | 11/2005 | Cutrer |
| 2006/0121944 A1 | 6/2006 | Buscaglia et al. |
| 2006/0183420 A1 | 8/2006 | Solum |
| 2006/0193295 A1 | 8/2006 | White et al. |
| 2007/0032241 A1 | 2/2007 | Busch et al. |
| 2007/0093262 A1 | 4/2007 | Li et al. |
| 2008/0198955 A1 | 8/2008 | Oren et al. |
| 2008/0200117 A1 | 8/2008 | Oren et al. |
| 2011/0274145 A1 | 11/2011 | Braz et al. |
| 2012/0093084 A1 | 4/2012 | Wala et al. |
| 2012/0149411 A1 | 6/2012 | Miyoshi et al. |
| 2013/0028341 A1 | 1/2013 | Ayach et al. |
| 2013/0051278 A1 | 2/2013 | Watkins et al. |
| 2013/0095870 A1 | 4/2013 | Phillips et al. |
| 2013/0170353 A1 | 7/2013 | Liu |
| 2013/0201916 A1 | 8/2013 | Kummetz et al. |
| 2013/0272202 A1 | 10/2013 | Stapleton et al. |
| 2013/0329825 A1 | 12/2013 | Oren et al. |
| 2014/0016583 A1 | 1/2014 | Smith |
| 2014/0036758 A1 | 2/2014 | Wala |
| 2014/0072064 A1 | 3/2014 | Lemson et al. |
| 2014/0162713 A1 | 6/2014 | Stapleton et al. |
| 2014/0169408 A1 | 6/2014 | Bayesteh et al. |
| 2014/0269502 A1 | 9/2014 | Forenza et al. |
| 2015/0304044 A1 | 10/2015 | Stapleton et al. |
| 2016/0248508 A1 | 8/2016 | Wala |

FOREIGN PATENT DOCUMENTS

| | | |
|---|---|---|
| EP | 0346925 | 12/1989 |
| EP | 0368673 | 5/1990 |
| EP | 0391597 | 10/1990 |
| EP | 0468688 | 1/1992 |
| EP | 0664621 | 7/1995 |
| EP | 0876073 | 11/1998 |
| EP | 1954075 | 8/2008 |
| FR | 2345865 | 10/1977 |
| GB | 2253770 | 9/1992 |
| GB | 2289198 | 11/1995 |
| GB | 2300549 | 11/1996 |
| GB | 2315959 | 2/1998 |
| GB | 2320653 | 6/1998 |
| JP | 58164007 | 9/1983 |
| JP | 3026031 | 2/1991 |
| WO | 9115927 | 10/1991 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 0021221 | 4/2000 |
| WO | 0174013 | 10/2001 |
| WO | 0174100 | 10/2001 |

OTHER PUBLICATIONS

US Patent Office, "Office Action", "from U.S. Appl. No. 12/467,924", dated Sep. 15, 2010, pp. 1-16, Published in: US.

International Search Authority, "International Search Report from PCT Application No. PCT/US03/38350", "from Foreign Counterpart of U.S. Appl. No. 10/308,854", dated Nov. 5, 2004, pp. 1-6, Published in: WO.

International Search Authority, "Written Opinion from PCT Application No. PCT/US03/38350", "from Foreign Counterpart of U.S. Appl. No. 10/308,854", dated Apr. 21, 2005, pp. 1-4, Published in: WO.

China Patent Office, "First Office Action for CN Patent Application No. 200380109397.8", "from Foregin Counterpart of U.S. Appl. No. 10/414,907", dated Dec. 9, 2008, pp. 1-10, Published in: CN.

(56) References Cited

OTHER PUBLICATIONS

US Patent Office, "Notice of Allowance", "from U.S. Appl. No. 10/414,907", dated Sep. 29, 2005, pp. 1-9, Published in: US.
US Patent Office, "Notice of Allowance", "from U.S. Appl. No. 10/414,907", dated Apr. 26, 2006, pp. 1-9, Published in: US.
US Patent Office, "Office Action", "from U.S. Appl. No. 11/469,623", dated Apr. 18, 2008, pp. 1-12, Published in: US.
US Patent Office, "Final Office Action", "from U.S. Appl. No. 11/469,623", dated Nov. 7, 2008, pp. 1-6, Published in: US.
US Patent Office, "Notice of Allowance", "from U.S. Appl. No. 11/469,623", dated Jan. 13, 2009, pp. 1-4, Published in: US.
US Patent Office, "Notice of Allowance", "from U.S. Appl. No. 11/469,623", dated Feb. 27, 2009, pp. 1-8, Published in: US.
International Search Authority, "International Preliminary Report on Patentability for PCT Application No. PCT/US03/38354", "from Foreign Counterpart to U.S. Appl. No. 10/414,907", dated Aug. 3, 2006, p. 1-4 Published in: WO.
International Search Authority, "International Search Report from PCT Application No. PCT/US03/38354", "from Foregin Counterpart of U.S. Appl. No. 10/414,907", dated Nov. 24, 2004, pp. 1-5, Published in: WO.
Wala, "A New Microcell Architecture Using Digital Optical Transport", "Proceedings of the Vehicular Technology Conference", May 18, 1993, pp. 585-588, Publisher: IEEE, Published in: US.
Merrett et al., "A Cordless Access System Using Radio-Over-Fibre Techniques", "41st IEEE Vehicular Technology Conference Gateway to the Future Technology in Motion", May 19, 1991, pp. 921-924, Published in: St.Louis, MO.
Lee et al., "Intelligent Microcell Applications in PCS", "43rd IEEE Vehicular Technology Conference, Personal Communication—Freedom Through Wireless Technology", May 18, 1993, pp. 722-725, Publisher: Pactel Corporation, Published in: Secaucus, NJ.
Lewis, "ADC-Kentrox Call Report With Bell Atlantic", Oct. 18, 1992, pp. 1-3.
ADC Kentrox, "ADC Kentrox Introduces Innovative Wireless Network Access Solution Cellular Subscribers Offered a New Level of Portable", Mar. 1, 1993, pp. 1-3, Publisher: ADC Kentrox, Published in: Portland, OR.
"ADC Kentrox Wireless Systems Group Citycell 824—A Positioning White Paper", Mar. 1993, pp. 1-6, Publisher: Cita Trade Show.
Alade et al., "Uplink Co-Channel Interference Analysis and Cancellation in Femtocell Based Distibuted Antenna System", "Communications (ICC), 2010 IEEE Internation Conference on", 2010, pp. 1-5, Publisher: IEEE.
"And Now a Few Words From Your Customers . . . ", Aug. 1, 1992, pp. 1-4, Publisher: ADC Kentrox, Published in: Portland, OR.
Foxcom Wireless Proprietary Information, "Application Note Rfiber-RF Fiberoptic Links for Wireless Applications", 1998, pp. 3-11.
Cox, "A Radio System Proposal for Widespread Low-Power Tetherless Communications", "IEEE Transactions on Communications", Feb. 1991, pp. 324-335, vol. 39, No. 2, Publisher: IEEE.
Ishio et al, "A Two-Way Wavelength-Division-Multiplexing Transmission and Its Application to a Switched TV-Distribution System", Dec. 22, 2000, pp. 1-10, Publisher: Ekectrical Communication Laboratories, Nipon Telegraph and Telepone Corporation, Published in: Yokosuka, Japan.
Ameritech, "Broadband Optical Transport Digital Microcell Connection Service-Interface and Performance Specifications a Technical D", "Cellular Industry", Dec. 1993, pp. 1-26, Publisher: The Day Group.
City Cell, Cellular Industry the Day Group, "ADC Kentrox Citycell Field Trial Yields Another First—Simultaneous Analog and Digital Calls", prior to Dec. 22, 2000, p. 1.
Stern, "Passive Optical Local Networks for Telephony Applications and Beyond", "Electronics Letters an International Publication", Nov. 19, 1987, pp. 1255-1257, vol. 23, No. 24, Publisher: IEEE.
"ADC Kentrox Introduces Citycell 824, A Replacement for Conventional Cell Sites; Company's Original Goal Was to Improve Fiber Optic T1 Links Between Cells, MTSOs", "Telocator Bulletin", Feb. 1993, p. 1.

Tang, "Fiber Optic Antenna Remoting for Multi-Sector Cellular Cell Sites", "GTE Laboratories—Abstract", Jun. 1992 , pp. 1-22.
ADC Kentrox, "First Field Trial Results Exceed Expectations ADC Kentrox and Cellular One Join Force to Provide a New Level of Portable", Mar. 2, 1993, pp. 1-2, Publisher: ADC Kentrox, Published in: Portland, OR.
Payne et al., "Single Mode Optical Local Networks", "Globecom '85 IEEE Global Telecommunications Conference", Dec. 2-5, 1985, pp. 1201-1206, vol. 3 of 3, Publisher: IEEE, Published in: New Orleans, LA.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
"Urban Microcell System Layout", Dec. 3, 2004, pp. 1-13.
Tang, "Fiber Optic Antenna Remoting for Multi-Sector Cellular Cell Sites", Jul. 9, 1993, Published in: US.
Harvey et al., "Cordless Communications Utilising Radio Over Fibre Techniques for the Local Loop", "IEEE International Conference on Communications", Jun. 1991, pp. 1171-1175, Publisher: IEEE.
Heath et al., "A Current Perspective on Distibuted Antenna Systems for the Downlink of Cellular Systems", "IEEE Communications Magazine", Apr. 2013, pp. 2-9, Publisher IEEE.
Steele, "Towards a High-Capacity Digital Cellular Mobile Radio System", "IEEE Proceedings-P Special Issue on Land Mobile Radio", Aug. 1985, pp. 405-415, vol. 132, PT F, No. 5, Publisher: IEEE.
Akos et al., "Direct Bandpass Sampling of Multiple Distinct RF Signals", "IEEE Transactions on Communications", Jul. 1999, pp. 983-988, vol. 47, No. 7.
Titch, "Kentrox Boosts Coverage and Capacity", "Telephony", Jan. 25, 1993, pp. 1-2.
ADC, "First Field Trial Results Exceed Expectations", Mar. 2, 1993, Published in: US.
Gupta et al., "Land Mobile Radio Systems—A Tutorial Exposition", "IEEE Communications Magazine", Jun. 1985, pp. 34-45, vol. 23, No. 6, Publisher: IEEE.
Foxcom Wireless Properietary Information, "Litenna In-Building RF Distribution System", "White Paper Document No. 42-14-001-09C", 1998, pp. 1-8, Publisher: Foxcom Wireless.
Schneiderman, "Offshore Markets Gain in Size, Competitiveness Even the Smallest Industry Companies Are Expanding Their Global Buisness", "Microwaves and RF", Mar. 1993, pp. 33-39, vol. 32, No. 3, Publisher: Penton Publishing, Inc, Published in: Berea, OH.
"Digital Transport for Cellular", "Microwaves and RF", Feb. 1993, Published in: Portland, OR.
Russell, "New Microcell Technology Sets Cellular Carriers Free", "Telephony", Mar. 1993, pp. 40, 42, and 46.
Cellular Industry, The Day Group, "New Signal Transport Technology Digitizes the Cellular Band", Dec. 22, 2000, p. 2.
Kobb, "Personal Wireless", "IEEE Spectrum", Jun. 1993, pp. 20-25, Publisher: IEEE.
Nakatsugawa et al., "Software Radio Base and Personal Stations for Cellular-PCS Systems", 2000, pp. 617-621, Publisher: IEEE.
"InterReach Spectrum: In-Building Wireless Distributed Antenna System", "GrayBaR", Sep. 2011, pp. 1-12, Publisher: TE Connectivity.
"Tektronix Synchronous Optical Network (SONET)", "http://www.iec.org/online/tutorials/sonet/topic03.html", Aug. 28, 2002, pp. 1-5, Publisher International Engineering Consortium.
ADC Kentrox, "ADC Kentrox introduces CityCell 824, A Replacement for Conventional Cell Sites", Feb. 1993, Published in: us.
Quinn, "The Cell Enhancer", 1982, pp. 77-83, Publisher: Bell Atlanttic Mobile Systems.
"Urban Microcell System Layout—Presentation", Jun. 14-18, 1992, pp. 1-13, Publisher: GTE Laboritories.
O'Byrne, "TDMA and CDMA in a Fiber-Optic Environment", "Vehicular Technology Society 42nd VTS Conference Frontiers of Technology From Pioneers to the 21st Century", May 10-13, 1992, pp. 727-731, vol. 2 of 2, Publisher: GTE Laboratories Inc., Published in: Denver, CO.

(56) References Cited

OTHER PUBLICATIONS

Wala, "A New Microcell Architecture Using Digital Optical Transport", "Freedom Through Wireless Technogolgy", May 18, 1993, pp. 585-588, Publisher: Proceedings of the Vehicular Technology Conference, New York, IEEE, Published in: US.
ADC Kentrox, "CityCell 824, A Positioning White Paper", Mar. 1993, 6 pages, Cita Trade Show, Published in: US.
Zonemaster, "Maximum Coverage for High-Capacity Locations", "Decibel Products", 1993, pp. 1-4, Publisher: Decibel Multi Media Microcell System.
U.S. Patent Office, "Notice of Allowance", "from U.S. Appl. No. 14/624,195", dated Oct. 11, 2016, pp. 1-42, Published in: US.
U.S. Patent Office, "Office Action", "from U.S. Appl. No. 14/624,195", dated May 12, 2016, pp. 1-27, Published in: US.
International Search Authority, "International Search Report and Written Opinion for PCT Application No. PCT/US2015/016161", dated May 18, 2015, pp. 1-11, Published in: WO.
US Patent Office, "Notice of Allowance", "from U.S. Appl. No. 10/084,115", dated Oct. 18, 2006, pp. 1-7, Published in: US.
US Patent Office, "Office Action", "from U.S. Appl. No. 10/084,115", dated Oct. 12, 2005, pp. 1-9, Published in: US.
US Patent Office, "Office Action", "from U.S. Appl. No. 10/084,115", dated May 19, 2006, pp. 1-8, Published in: US.
US Patent Office, "Final Office Action", "from U.S. Appl. No. 11/677,799", dated Sep. 8, 2008, pp. 1-7, Published in: US.
US Patent Office, "Notice of Allowance", "from U.S. Appl. No. 11/677,799", dated Jan. 5, 2009, pp. 1-7, Published in: US.
US Patent Office, "Office Action", "from U.S. Appl. No. 11/677,799", dated Feb. 8, 2008, pp. 1-7, Published in: US.
US Patent Office, "Notice of Allowance", "from U.S. Appl. No. 12/404,544", dated Feb. 14, 2011, pp. 1-16, Published in: US.
US Patent Office, "Office Action", "from U.S. Appl. No. 12/404,544", dated Oct. 6, 2010, pp. 1-37, Published in: US.
US Patent Office, "Notice of Allowance", "from U.S. Appl. No. 10/118,071", dated Nov. 29, 2005, pp. 1-6, Published in: US.
US Patent Office, "Office Action", "from U.S. Appl. No. 10/118,071", dated Jun. 23, 2004, pp. 1-8, Published in: US.
US Patent Office, "Office Action", "from U.S. Appl. No. 10/118,071", dated May 6, 2005, pp. 1-12, Published in: US.
US Patent Office, "Notice of Allowance", "from U.S. Appl. No. 11/379,702", dated Jan. 12, 2009, pp. 1-8, Published in: US.
US Patent Office, "Office Action", "from U.S. Appl. No. 11/379,702", dated Jul. 29, 2008, pp. 1-11, Published in: US.
China Patent Office, "Notice of Grant for CN Application No. 200380109399.7", "from Foregin Counterpart of U.S. Appl. No. 10/308,854", dated Apr. 25, 2008, pp. 1-3, Published in: CN.
China Patent Office, "First Office Action for CN Patent Application No. 200380109399.7", "from Foregin Counterpart of U.S. Appl. No. 10/308,854", dated Jan. 12, 2007, pp. 1-9, Published in: CN.
China Patent Office, "Second Office Action for CN Patent Application No. 200380109399.7", "from Foregin Counterpart of U.S. Appl. No. 10/308,854", dated Nov. 9, 2007, pp. 1-5, Published in: CN.
European Patent Office, "Supplementary European Search Report for EP Application No. 03796586.0", "from Foregin Counterpart of U.S. Appl. No. 10/308,854", dated Dec. 28, 2009, pp. 1-3, Published in: EP.
European Patent Office, "Communication Under Rule 71(3) for EP Patent Application No. 03796586.0", "from Foregin Counterpart of U.S. Appl. No. 10/308,854", dated Apr. 19, 2013, pp. 1-39, Published in: EP.
European Patent Office, "Office Action for EP Patent Application No. 03796586.0", "from Foregin Counterpart of U.S. Appl. No. 10/308,854", dated Apr. 26, 2010, pp. 1-4, Published in: EP.
Korean Patent Office, "Decision to Register a Patent KR Patent Application No. 2005-7010192", "from Foregin Counterpart of U.S. Appl. No. 10/308,854", dated Jan. 24, 2011, pp. 1-3, Published in: KR.
Korean Patent Office, "Office Action for KR Patent Application No. 2005-7010192", "from Foreign Counterpart of U.S. Appl. No. 10/308,854", dated May 14, 2010, pp. 1-6, Published in: KR.
US Patent Office, "Notice of Allowance", "from U.S. Appl. No. 10/308,854", dated Aug. 12, 2005, pp. 1-8, Publishes in: US.
US Patent Office, "Notice of Allowance", "from U.S. Appl. No. 10/308,854", dated Jan. 17, 2006, pp. 1-3, Publishes in: US.
US Patent Office, "Notice of Allowance", "from U.S. Appl. No. 10/308,854", dated Sep. 21, 2006, pp. 1-8, Publishes in: US.
US Patent Office, "Office Action", "from U.S. Appl. No. 10/308,854", dated Nov. 17, 2004, pp. 1-9, Published in: US.
US Patent Office, "Office Action", "from U.S. Appl. No. 10/308,854", dated Apr. 12, 2006, pp. 1-11, Published in: US.
US Patent Office, "Final Office Action", "from U.S. Appl. No. 11/624,541", dated Nov. 14, 2008, pp. 1-21, Published in: US.
US Patent Office, "Notice of Allowance", "from U.S. Appl. No. 11/642,541", dated Jan. 30, 2009, pp. 1-8, Publishes in: US.
US Patent Office, "Office Action", "from U.S. Appl. No. 11/624,541", dated May 5, 2008, pp. 1-22, Published in: US.
European Patent Office, "Extended European Search Report from EP Application No. 15752044.6 dated Sep. 12, 2017", "from Foreign Counterpart of U.S. Appl. No. 14/624,195", dated Sep. 12, 2017, pp. 1-11, Published in: EP.
European Patent Office, "Communication pursuant to Article 94(3) from EP Application No. 15752044.6 dated Jan. 4, 2019", from Foreign Counterpart to U.S. Appl. No. 14/624,195, dated Jan. 4, 2019, pp. 1-8, Published: EP.

* cited by examiner

SELECTIVELY COMBINING UPLINK SIGNALS IN DISTRIBUTED ANTENNA SYSTEMS

CROSS-REFERENCE TO RELATED APPLICATION

This application is a continuation application of U.S. patent application Ser. No. 14/624,195 entitled "SELECTIVELY COMBINING UPLINK SIGNALS IN DISTRIBUTED ANTENNA SYSTEMS" filed on Feb. 17, 2015 which claims the benefit of U.S. Provisional Patent Application Ser. No. 61/941,272 entitled "Selectively Combining Uplink Signals in Distributed Antenna Systems" filed Feb. 18, 2014, each of which are herby incorporated herein by reference.

TECHNICAL FIELD

The present disclosure relates generally to telecommunication systems and more particularly (although not necessarily exclusively) to selectively combining uplink signals in distributed antenna systems.

BACKGROUND

A distributed antenna system ("DAS") can be used to provide wireless communications coverage in a variety of environments, particularly in large structures such as office buildings, convention halls, airports, stadiums, and the like. A DAS can include one or more master units or other head-end units that are communicatively coupled to one or more base stations. A DAS can also include multiple remote units that are communicatively coupled to each master unit. The remote units, each of which can include one or more transceivers and antennas, can be distributed across a coverage area. The remote units can transmit the downlink signals to mobile phones or other terminal devices within coverage areas serviced by the remote units.

A master unit of a DAS may combine uplink transmissions received from several remote units into a composite signal. Combining uplink transmissions from different remote units communicating with the same terminal device can boost the power of weak uplink signals received by one or more remote units. The composite uplink signal may be provided to a base station that communicates with the DAS.

A master unit may combine uplink transmissions regardless of whether the uplink transmissions includes uplink signals from terminal devices or includes only uplink noise. Combining uplink signals regardless of whether uplink signals from terminal devices are present may present disadvantages. For example, uplink transmissions from one or more remote units may include noise on one or more channels, even if no uplink signal has been received by the remote units. Combining the uplink transmissions from each of the remote units to generate a composite uplink signal can combine the received noise in each uplink channel. If some of the uplink transmissions includes noise but does not include an uplink signal, indiscriminately combining uplink transmissions may unnecessarily increase the noise floor for the composite uplink signal and limit the number of remote units used in the DAS.

SUMMARY

According to one aspect, a method is provided for selectively combining uplink signals in a distributed antenna system ("DAS"). The method involves a unit of the DAS receiving baseband uplink transmissions from remote units of the DAS via a first channel and a second channel. The method also involves generating a first combined uplink signal by combining a first portion of the baseband uplink transmissions received from a first subset of the remote units via the first channel. The first portion of the baseband uplink transmissions includes data for transmission to a base station. The method also involves generating a second combined uplink signal that includes a portion of the baseband uplink transmissions received from a second subset of the remote units via the second channel. In the second combined uplink signal, a portion of the baseband uplink transmissions that are received from the first subset of the remote units via the second channel and that lack data for transmission to the base station are excluded or attenuated. The method also involves transmitting the first combined uplink signal and the second combined uplink signal to the base station.

According to another aspect, a unit is provided for selectively combining uplink signals in a DAS. The unit can receive baseband uplink transmissions from remote units of the DAS via a first channel and a second channel. The unit can generate a first combined uplink signal by combining baseband uplink transmissions received from a first subset of the remote units via the first channel that include data for transmission to a base station. The unit can generate a second combined uplink signal that includes baseband uplink transmissions received from a second subset of the remote units via the second channel. In the second combined uplink signal, baseband uplink transmissions received from the first subset of the remote units via the second channel and that lack data for transmission to the base station are excluded or attenuated. The unit can transmit the combined uplink signals to the base station.

According to another aspect, a DAS is provided that can selectively combine channelized uplink signals. The DAS can include a unit that is communicatively coupled to remote units. The remote units can extract baseband uplink transmissions from uplink traffic received in one or more channels in an RF band. The unit can receive baseband uplink transmissions from remote units of the DAS via a first channel and a second channel. The unit can generate a first combined uplink signal by combining baseband uplink transmissions received from a first subset of the remote units via the first channel that include data for transmission to a base station. The unit can generate a second combined uplink signal that includes baseband uplink transmissions received from a second subset of the remote units via the second channel. In the second combined uplink signal, baseband uplink transmissions that are received from the first subset of the remote units via the second channel and that lack data for transmission to the base station are excluded or attenuated. The unit can transmit the combined uplink signals to the base station.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Certain aspects and features relate to selectively combining uplink transmissions in a distributed antenna system ("DAS"). Selectively combining uplink transmissions can involve combining portions of a spectrum that include uplink signals from terminal devices and excluding or attenuating portions of the spectrum from which uplink signals are absent (i.e., "empty" portions of the spectrum). In some aspects, a unit of a DAS can analyze each channel from a set of channels used by the DAS to identify which remote units have transmitted uplink transmissions with data for that channel. The unit can generate a combined uplink signal for each of the channels. Generating the combined uplink signal can involve excluding or attenuating uplink transmissions that lack data to be transmitted (e.g., uplink transmissions containing only noise or uplink transmissions with an unacceptable signal-to-noise ratio).

The performance of a DAS can be improved by selectively combining uplink transmissions from different remote units. For example, selecting portions of uplink transmissions from a remote unit having data received from terminal devices and excluding or attenuating other portions of uplink transmissions from remote units that do not have data received from terminal devices can avoid unnecessarily increasing a noise floor for a combined uplink signal. Reducing or minimizing the noise floor for a combined uplink signal may increase the number of remote units that can be used in the DAS.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Figure 1:
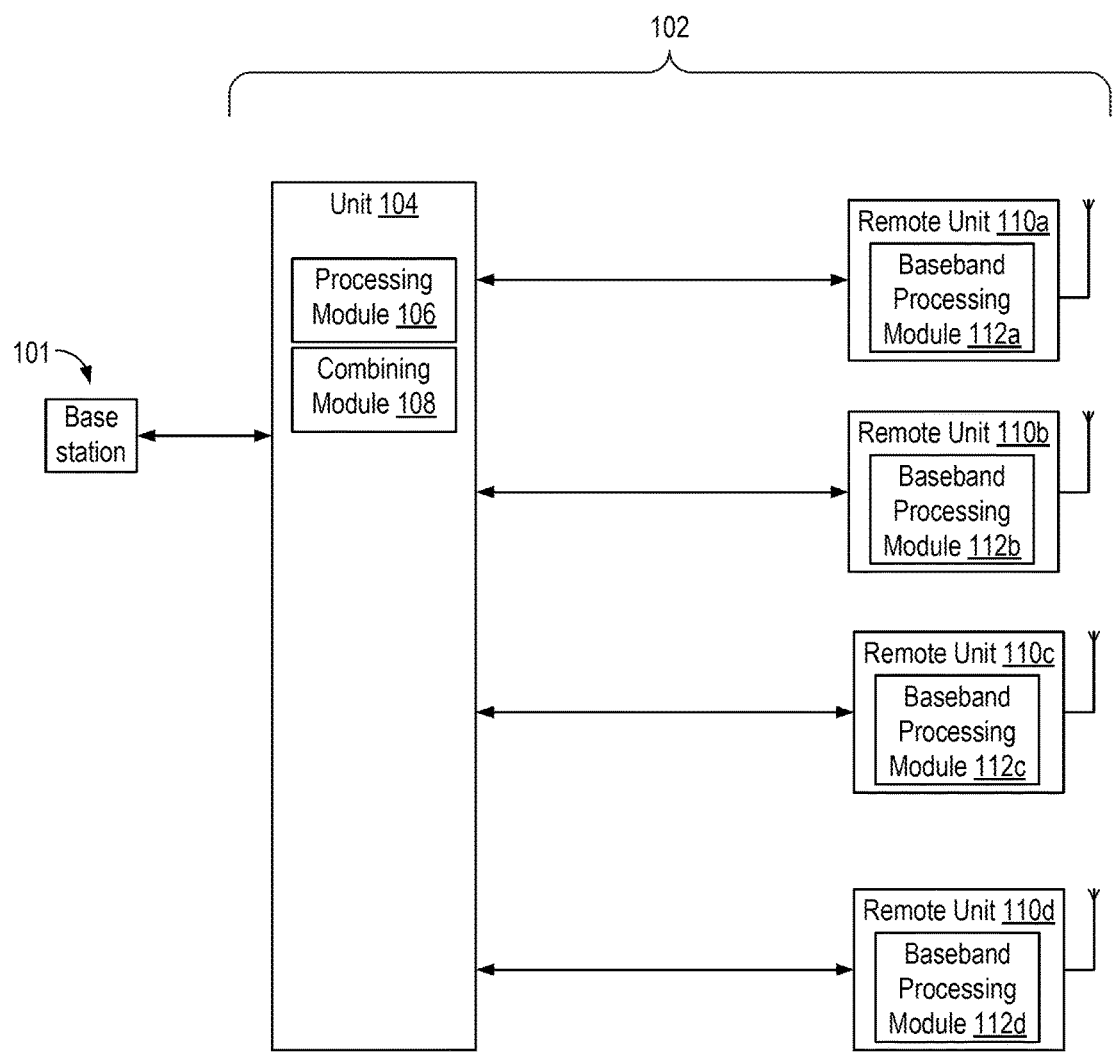
FIG. 1 is a block diagram depicting an example of a distributed antenna system ("DAS") that can selectively combine uplink transmissions according to one aspect of the present disclosure.

FIG. 1 is a block diagram depicting an example of a DAS 102 that can selectively combine uplink signals. The DAS 102 can communicate signals between one or more base stations 101 or other transceiving devices (e.g., repeaters) and terminal devices in one or more coverage zones serviced by the DAS 102. Terminal devices can be electronic devices used to communicate one or more of voice and data via a telecommunication system, such as (but not limited to) mobile phones.

The DAS 102 can include one or more units 104 having one or more processing modules 106 and one or more combining modules 108. Examples of a unit 104 include a master unit, a base station router, or other suitable unit that can communicate with a base station. In some aspects, the unit 104 can be a master unit or other suitable unit that can communicate with one or more base stations 101 or other transceiving devices in communication with the DAS 102. A master unit can include, for example, an optical transceiver that transmits optical signals to the remote units 110a-d. The master unit or other suitable unit 104 can communicate with remote units 110a-d in different coverage zones of the same DAS 102. In additional or alternative aspects, the unit 104 can be included in a base station router or other suitable unit that can communicate signals between one or more base stations 101 and one or more master units. In additional or alternative aspects, the unit 104 can be included in an extension unit or other suitable unit that can communicate signals between one or more master units and the remote units 110a-d.

The DAS 102 can also include remote units 110a-d having respective baseband processing modules 112a-d. The remote units 110a-d can include transceiving devices that can include or be communicatively coupled to one or more antennas. A non-limiting example of a remote unit is a universal access point. Although FIG. 1 depicts one unit 104 and four remote units 110a-d, a DAS 102 can include any number of units 104 and any number of remote units.

The DAS 102 can communicate signals to and from terminal devices via the unit 104 and the remote units 110a-d that service one or more coverage zones. The unit 104 can be communicatively coupled with the base station 101 and the remote units 110a-d in any suitable manner. Communicatively coupling devices in a DAS 102 or other telecommunication system can involve establishing, maintaining, or otherwise using a communication link (e.g., a cable, an optical fiber, a wireless link, etc.) to communicate information between the devices. Any suitable types of communication links can be used in the DAS 102. A suitable communication link can be a wired connection or a wireless connection. Types of wired connection can include, for example, a connection via a copper cable, an optical fiber, or another suitable communication medium. Types of wireless connections can include, for example, a wireless RF communication link or a microwave link. The type of communication link between the base station 101 and the unit 104 can be the same as or different from the type of communication link between the unit 104 and the remote units 110a-d.

The unit 104 can provide downlink signals from the base station 101 to the remote units 110a-d and receive uplink signals from the remote units 110a-d to be provided to the base station 101. Downlink signals can include signals provided from the base station 101 and transmitted by the remote units 110a-d in coverage zones.

The remote units 110a-d can provide signal coverage in one or more coverage zones. Providing signal coverage in the coverage zones can include wirelessly transmitting downlink signals received from the unit 104 to terminal devices in the coverage zones. Providing signal coverage in the coverage zones can also include wirelessly receiving uplink signals from the mobile communication devices or other terminal devices in the coverage zones. Uplink signals are signals at frequencies in an uplink frequency band that are recovered or otherwise received by one or more of the remote units 110a-d from terminal devices. The remote units 110a-d can transmit the uplink signals to the unit 104. The unit 104 can transmit the uplink signals to the base station 101.

Although FIG. 1 depicts a direct link between the unit 104 and the remote units 110a-d, other implementations are possible. In some aspects, the unit 104 can be communicatively coupled to the remote units 110a-d via one or more extension units or other intermediate devices.

The unit 104 can combine uplink transmissions received from some or all of the remote units 110a-d into a combined uplink signal, such as a composite signal. A transmitter of the unit 104 can transmit the combined uplink signal to an uplink receiver of the base station 101.

Uplink transmissions can include uplink signals received by remote units 110a-d from terminal devices. In some aspects, the uplink transmissions can include down-converted versions of these uplink signals. In additional or alternative aspects, the uplink transmissions can include digitized versions of these uplink signals. Uplink transmissions received from remote units 110a-d can also include one or more of noise received by the remote units 110a-d from their surrounding environment, noise from one or more electronic components used by a remote unit to receive signals, and noise generated in an uplink path between a remote unit and the unit 104. In some cases, uplink transmissions can include both uplink signals and uplink noise or weak uplink traffic. In other cases, uplink transmissions may not include uplink signals or may include weak uplink signals with high signal-to-noise ratios. Examples of such cases include cases in which terminal devices are not close enough to a remote unit for received uplink signals to exceed the noise floor.

The unit 104 can use the processing module 106 and the combining module 108 to selectively combine uplink transmissions received from the remote units 110a-d. Selectively combining uplink transmissions can involve combining portions of the spectrum where uplink signals are present and excluding portions of the spectrum from which uplink signals from terminal devices are absent (e.g., "empty" portions of the spectrum). Selectively combining uplink transmissions can reduce an amount of noise in a combined uplink signal provided to a base station 101. The processing module 106 and the combining module 108 can include one or more devices configured to select uplink signals for a combination, programming instructions executable by a processor to select uplink signals for a combination, or any suitable combination thereof.

In some aspects, the DAS 102 can selectively combine channelized baseband uplink transmissions. Channelized baseband uplink transmissions can include call information for wireless communication with terminal devices. For example, the baseband processing modules 112a-d of the remote units 110a-d can include channelizer sections that can extract, per channel, channelized baseband uplink signals using channel filters and down-converters. The remote units 110a-d can provide the channelized baseband uplink transmissions to the unit 104.

Selectively combining channelized uplink transmissions can allow the unit 104 to optimize the generation of combined uplink signals to be transmitted to a base station 101. For example, three terminal devices may be geographically located in a coverage area serviced by the DAS 102. A frequency band including at least three frequency channels can be used by the terminal devices to communicate with remote units of the DAS 102. A first terminal device can be geographically located within the communication range of the remote units 110a, 110b and can communicate via a first frequency channel from the frequency band. Uplink transmissions received by the unit 104 from the remote units 110a, 110b can include data corresponding to the first frequency channel. A second terminal device can be geographically located within the communication range of remote units 110a, 110c, 110d and can communicate via a second frequency channel from the frequency band. Uplink transmissions received by the unit 104 from the remote units 110a, 110c, 110d can include data corresponding to the second frequency channel. A third terminal device can be geographically located within the communication range of remote unit 110d and can communicate via a third frequency channel from the frequency band. Thus, uplink transmissions received by the unit 104 from the remote units 110d can also include data corresponding to the third frequency channel. Data corresponding to a frequency channel can include, but may not be limited to, one or more of digitized RF data in the first frequency channel, analog signals in the first frequency channel, analog signals or digital data in an intermediate frequency channel, analog signals or digital data in a baseband frequency channel, etc.

In this example, the unit 104 can selectively combine uplink transmissions that are received from the different remote units and that correspond to different frequency channels used by the remote units to communicate with the terminal devices. For example, the unit 104 can generate a combined uplink signal for the first frequency channel by combining uplink signals received from the remote units 110a, 110b and having frequencies within or corresponding to the first frequency channel. The combined uplink signal for the first frequency channel can omit or attenuate uplink transmissions corresponding to the first frequency channel that is received from remote units 110c, 110d (e.g., noise on the first frequency channel). The unit 104 can generate a combined uplink signal for the second frequency channel by combining uplink signals received from the remote units 110a, 110c, 110d and having frequencies within or corresponding to the second frequency channel. The combined uplink signal for the second frequency channel can omit or attenuate uplink transmissions corresponding to the second frequency channel that is received from remote units 110c, 110d (e.g., noise on the second frequency channel). For the third frequency channel, the unit 104 can transmit an uplink signal that includes uplink signals received from the remote unit 110d and excludes or attenuates uplink transmissions received from remote units 110a-c.

Figure 2:
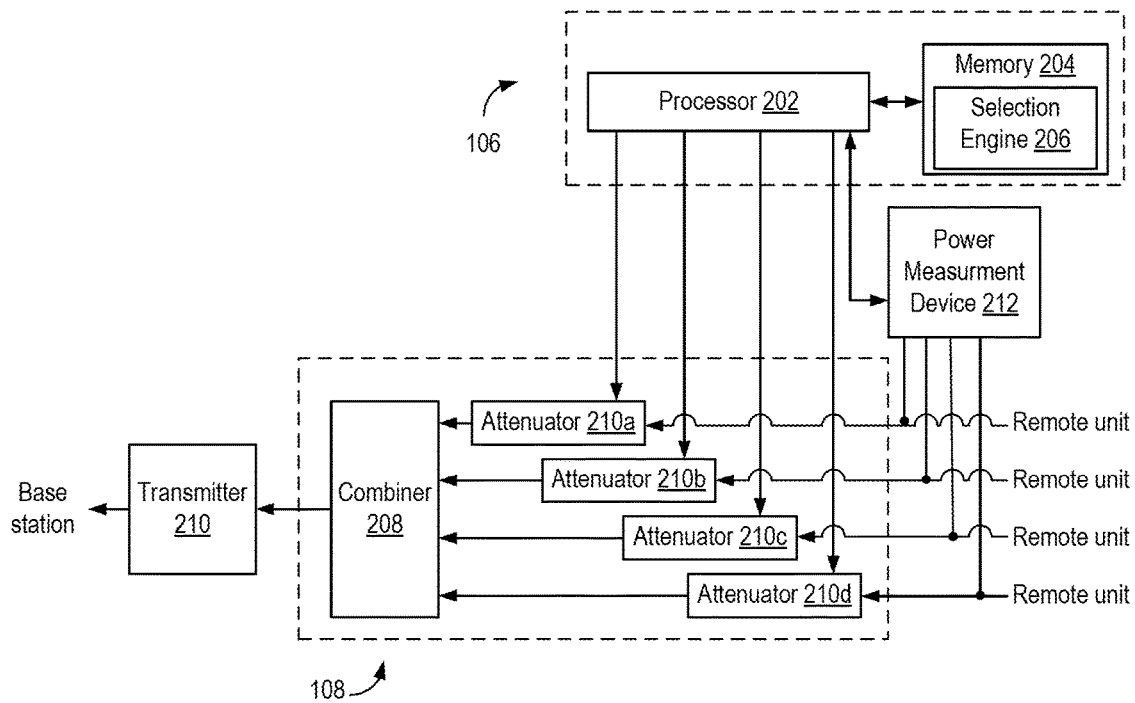
FIG. 2 is a block diagram depicting an example of a unit of the DAS from FIG. 1 that can selectively combine uplink transmissions received from remote units of the DAS according to one aspect of the present disclosure.

FIG. 2 is a block diagram depicting an example of a unit 104 that can selectively combine uplink transmissions according to one aspect. As depicted in FIG. 2, the processing module 106 can include a processor 202 and a memory 204. The processor 202 can be communicatively coupled to the combining module 108 and the memory 204. The processor 202 can include any processing device or group of processing devices configured for executing program code stored in the memory 204. Examples of the processor 202 include a microprocessor, an application-specific integrated circuit ("ASIC"), a field-programmable gate array ("FPGA"), or other suitable processor. The memory 204 can include, for example, a non-transitory computer-readable medium. The program code can include a selection engine 206 that can be executed by the processor 202.

The selection engine 206 can include one or more algorithms for selecting portions of uplink transmissions to be combined by the combining 208. The selection engine 206 can select a first portion of the uplink transmissions that includes data to be transmitted to the base station 101 (e.g., uplink transmissions including uplink signals from terminal devices). The selection engine 206 can identify a second portion of the uplink transmissions that does not include data to be transmitted to the base station (e.g., uplink transmissions that includes noise without uplink signals). The identification of the second uplink transmissions portion can cause the processor 202 to configure one or more components of the combining module 108 to exclude or attenuate the second uplink transmissions portion.

In some aspects, a power measurement device 212 can be included in the unit 104 or another device of the DAS 102. The power measurement device 212 can be communicatively coupled to the processing device 202 and uplink paths from the remote units 110a-d to the unit 104. (Although FIG. 2 depicts a single power measurement device 212, any number of power measurement devices 212 may be used.) The processor 202 can communicate with the power measurement device 212 to obtain data describing signal power levels for uplink transmissions from each of the remote units. In one example, the power measurement device 212 can have an analog output that is electrically connected to the processor 202. The power measurement device 212 can provide a voltage or a current to the processor 202 via the analog output. The voltage or current can be equivalent to or otherwise indicative of the measured power level in the uplink paths from the remote units 110a-d. In another example, the power measurement device 212 can provide a digital output signal to the processor 202 that represents the measured power level in the uplink paths from the remote units 110a-d. The processor 202 can execute the selection engine 206 to compare the data obtained from the power measurement device 212 with data stored in the memory 204 that describes a threshold signal power. Uplink transmissions having a signal power greater than or equal to the threshold signal power can be selected for inclusion in a combined uplink signal. Uplink transmissions having a signal power less than or equal to the threshold signal power can be selected for exclusion from or attenuation in a combined uplink signal.

In additional or alternative aspects, the unit 104 can use criteria other than signal power measurements to include or exclude uplink transmissions from a combination (e.g., scheduling information or spreading codes received from a base station 101, geographic locations of terminal devices in a coverage area of the DAS 102, etc.). In these aspects, the power measurement device 212 may be omitted.

The combining module 108 can include a combiner 208 and attenuators 210a-d. The combiner 208 can include any device or group of devices that can add or otherwise combine uplink transmissions into a combined uplink signal. An example of a combiner 208 is an adder. The attenuators 210a-d can include variable gain devices or other suitable devices that can attenuate one or more portions of uplink transmissions received from remote units. For example, the processor 202 can configure one or more of the attenuators 210a-d to attenuate uplink transmissions that does not include data to be transmitted to the base station 101. Attenuating a portion of uplink transmissions selected by the processor 202 can exclude or attenuate that portion of uplink transmissions in a combined uplink signal transmitted to the base station 101 via a transmitter 210 of the unit 104.

In additional or alternative aspects, the attenuators 210a-d can be used with or replaced by multipliers at inputs of the combiner 208. The processor 202 can configure the multipliers to cancel, minimize, or otherwise attenuate one or more portions of uplink transmissions at one or more inputs of the combiner 208. The multipliers can cause uplink transmissions portions to be excluded from or attenuated in a combined uplink signal transmitted to the base station 101.

Figure 3:
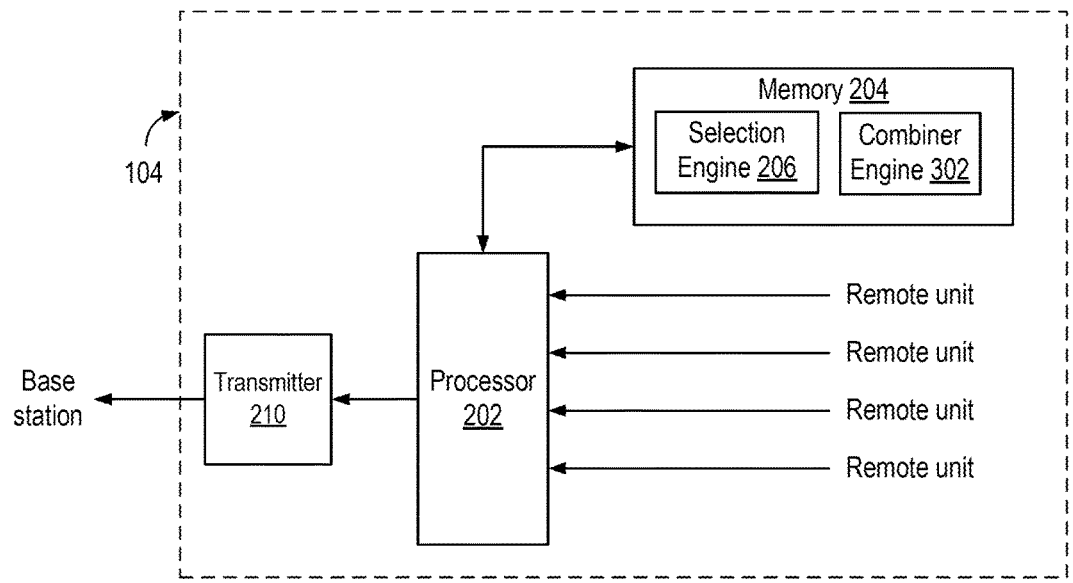
FIG. 3 is a block diagram depicting an alternative example of a unit of the DAS from FIG. 1 that can selectively combine uplink transmissions received from remote units of the DAS according to one aspect of the present disclosure.

In some aspects, the combining module 108 can be implemented using program code executable by the processor 202. For example, FIG. 3 is a block diagram depicting an alternative example of a unit 104 that can selectively combine uplink transmissions according to one aspect. The unit 104 depicted in FIG. 3 can omit the combiner 208 and the attenuators depicted in 210a-d depicted in FIG. 2.

As depicted in FIG. 3, the processor 202 can receive or otherwise access digital uplink transmissions that has been received by the unit 104. The selection engine 206 can be executed by the processor 202 to select one or more portions of the digital uplink transmissions to be combined and one or more portions of the digital uplink transmissions to be excluded. A combiner engine 302 can be stored in the memory 204 and can be executed by the processor 202. The combiner engine 302 can include one or more algorithms for combining selected portions of uplink transmissions that have been identified by the selection engine 206. The processor 202 can configure the transmitter 210 of the unit 104 to transmit a combined uplink signal including the selected uplink transmissions portions to the base station 101.

In some aspects, the unit 104 depicted in FIG. 2 can use a fast Fourier transform ("FFT") or other suitable transform to identify and select portions of uplink transmissions having data for transmission. In a non-limiting example, an FFT can be applied to uplink transmissions received from a remote unit to convert the uplink transmissions from the time domain to the frequency domain. The processor 202 can execute suitable program code to generate an FFT for channels used by the DAS 102. Each bin of the FFT can correspond to a sub-band of the received uplink transmissions. Each bin can include information about the uplink transmissions portion within the bandwidth of the bin, such as a magnitude and a phase for the sub-band in the bin. A length of the FFT being used can determine the bandwidth for each sub-band. For example, the processor 202 can obtain a 1,024-point FFT of a signal received by the unit. The sampling rate of the digital signal can be divided into the 1,024 FFT bins. The processor 202 can select at least some of the bins for combination with digitized uplink transmissions from other remote units. For example, the processor 202 can determine that one or more bins of an FFT or other frequency transform include data having a magnitude exceeding a threshold magnitude. The processor 202 can extract or otherwise select portions of uplink transmissions from a remote unit by selecting FFT bins corresponding to the sub-bands of interest.

In some aspects, the DAS 102 can selectively combine channelized baseband uplink transmissions using baseband processing modules of the remote units. For example, the unit 104 can combine uplink transmissions for telecommunication systems using channelized modulation formats (e.g., Global System for Mobile Communications ("GSM") systems). Selective combination of uplink transmissions from different frequency channels can be implemented using channelized squelch functions. For instance, twenty GSM channels may be included within 10 MHz of spectrum. Uplink signals received at each of the remote units 110a-d can be filtered into separate channels. The channelized signals can be transmitted to a unit 104. Each channel from each of the remote units 110a-d can be tested against a programmable threshold. For each channel, if an uplink signal within the channel has a signal strength above the threshold, the uplink signal can be combined into a composite signal for the channel. If the uplink signal does not have a signal strength above the threshold, the uplink signal can be excluded or otherwise omitted from the composite signal for the channel.

Figure 4:
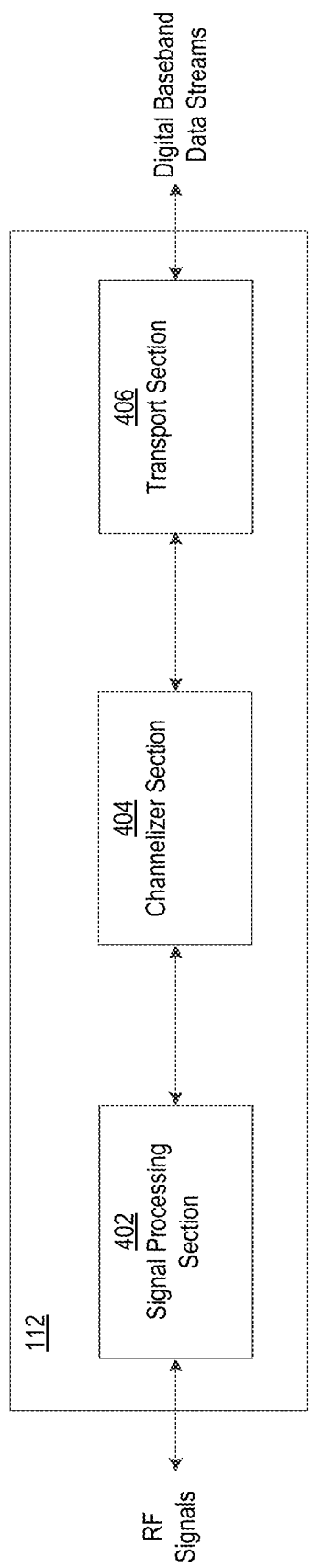
FIG. 4 is a block diagram depicting an example of a baseband processing module used by a remote unit of the DAS from FIG. 1 that obtains channelized baseband uplink transmissions to be selectively combined according to one aspect of the present disclosure.

FIG. 4 is a block diagram depicting an example of a baseband processing module 112 used for obtaining channelized baseband uplink transmissions to be selectively combined in the DAS 102 according to one aspect. The baseband processing unit 112 includes a signal processing section 402, a channelizer section 404, and a transport section 406.

The signal processing section 402 can receive RF signals, amplify and down-convert the RF signals, and convert the RF signals to digital signals. The signal processing section 402 can also convert digital signals to RF signals, and up-convert, amplify, and provide the RF signals.

The channelizer section 404 can process the digital signals on channel-by-channel bases. For example, the channelizer section 404 can digitally down-convert the digital signals to baseband and provide channelized baseband signals, and digitally up-convert channelized baseband signals and combine the digitally up-converted channelized baseband signals to provide digital signals.

The transport section 406 can prepare the channelized baseband signals for transport. For example, the transport section 406 can serialize and frame channelized baseband signals for transport and can de-frame and de-serialize the channelized baseband signals.

Figure 5:
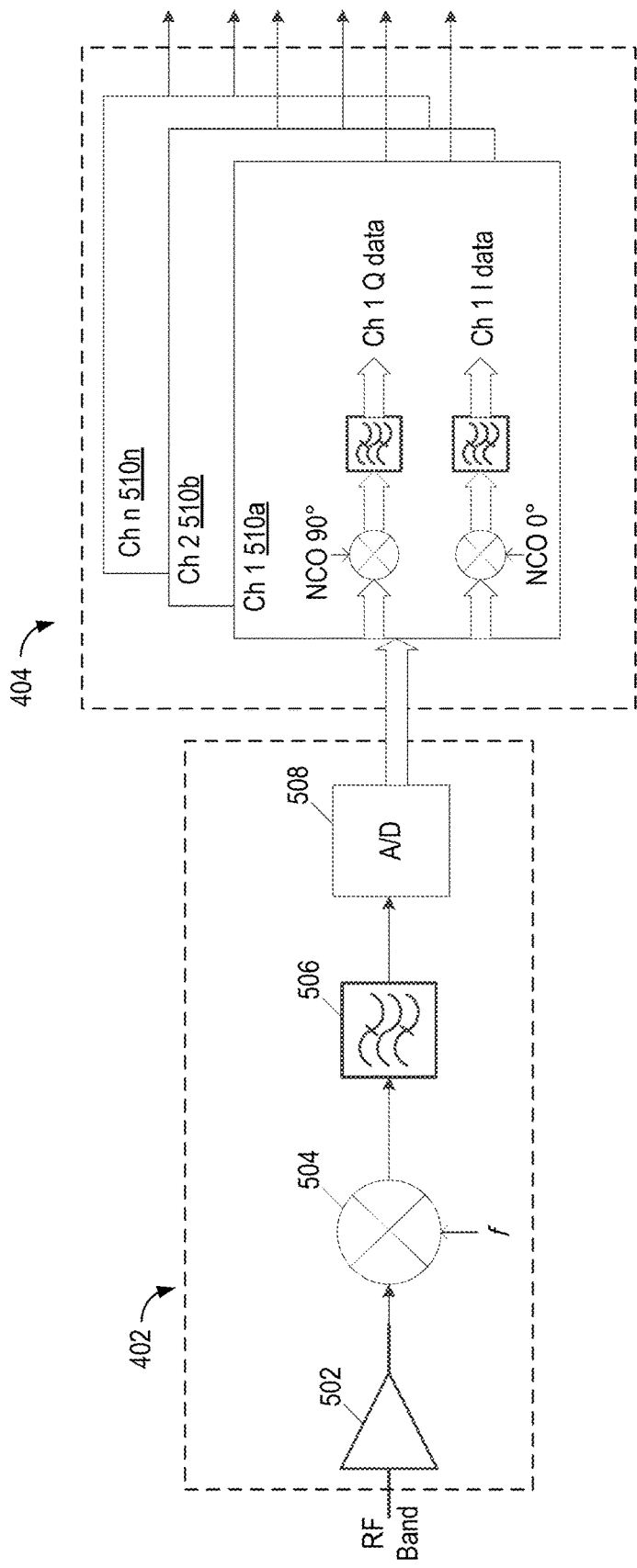
FIG. 5 is a partial schematic diagram depicting examples of a signal processing section and a channelizer section of the baseband processing module depicted in FIG. 4 according to one aspect of the present disclosure.

FIG. 5 depicts examples of the signal processing section 402 and the channelizer section 404.

The signal processing section 402 includes an input amplifier 502, a down-converting mixer 504, a bandpass filter 506, and an analog-to-digital converter ("ADC") 508. The input amplifier 502 can amplify uplink signals in an RF band. The RF band may be an RF spectrum including one or more carriers and information carried by the carriers. The down-converting mixer 504 can down-convert uplink signals in the RF band to an intermediate frequency using a mixing frequency. The bandpass filter 506 can filter the RF band at the intermediate frequency. In one example, the bandpass filter 506 has a bandwidth of 75 MHz with a center frequency of 350 MHz. The ADC 508 can convert the filtered RF band at the intermediate frequency according to a selected sample rate to digital signals.

The channelizer section 404 includes down-converting channel modules 510a-n. Each of the down-converting channel modules 510a-n can be associated with a respective channel. The down-converting channel modules 510a-n can demodulate each channel to baseband using I and Q mixers and numerically controlled oscillators ("NCOs"). Each NCO can be set to the center frequency of the channel. The output of the down-converting channel modules 510a-n can be digital signals sampled at a certain sample rate, such as 200 MHz. The digital signals can be digitally down-sampled by a decimation filter to reduce the sample rate to a level that is suitable for a single channel bandwidth. In an example involving seven active channels, seven decimation processes can be performed in parallel. The seven sets of I and Q data streams can be multiplexed onto a transport communication medium such that call information is transported, but not the RF spectrum or information about the RF spectrum.

Active channels in an RF band can have different amplitudes. When the RF band is recreated at another location, the channels can be gain equalized, which can allow the system to allocate power per channel by automatically adjusting the gain of the system to maintain a preset power for each carrier in the system. For example, an RF band may be 75 MHz wide and use a sample rate of 150 Msps to meet the Nyquist sampling criteria. Each of seven active channels can be independently demodulated to baseband. Each baseband signal may require a 10 Msps sampling rate to meet the Nyquist sampling criteria, although a 13.5 Msps rate can be used for practical filtering, producing 94.5 Msps (7×13.5) of data. A sample rate of 94.5 Msps may be less than half of the sample rate needed for transporting the information and other information about the RF band, such as carrier information and information between call information. The transport communication medium can be an expensive component of a telecommunications system, such as a DAS. Furthermore, transport communication mediums have a fixed bandwidth and a fixed amount of data capacity. Reducing the number of samples can reduce the amount of transport bandwidth that is used for transporting the same amount of call information, along with information from more bands, such as MIMO bands, to be transported.

The channelizer section 404 can be implemented in a device such as an FPGA, ASIC, or a digital signal processor ("DSP"). The NCOs and I and Q mixers can provide mixing stages for digitally mixing in-phase and quadrature components of signals. Examples of NCOs include modulo-n NCOs, such as modulo-2000 NCOs. In some aspects, a processor in the channelizer section 404 can be pre-configured with data about the channels, including each channel's center frequency, and can control each module accordingly. In other aspects, the channelizer section 404 can dynamically determine data about each of the channels by analyzing a received spectrum, and can control each module accordingly.

Figure 6:
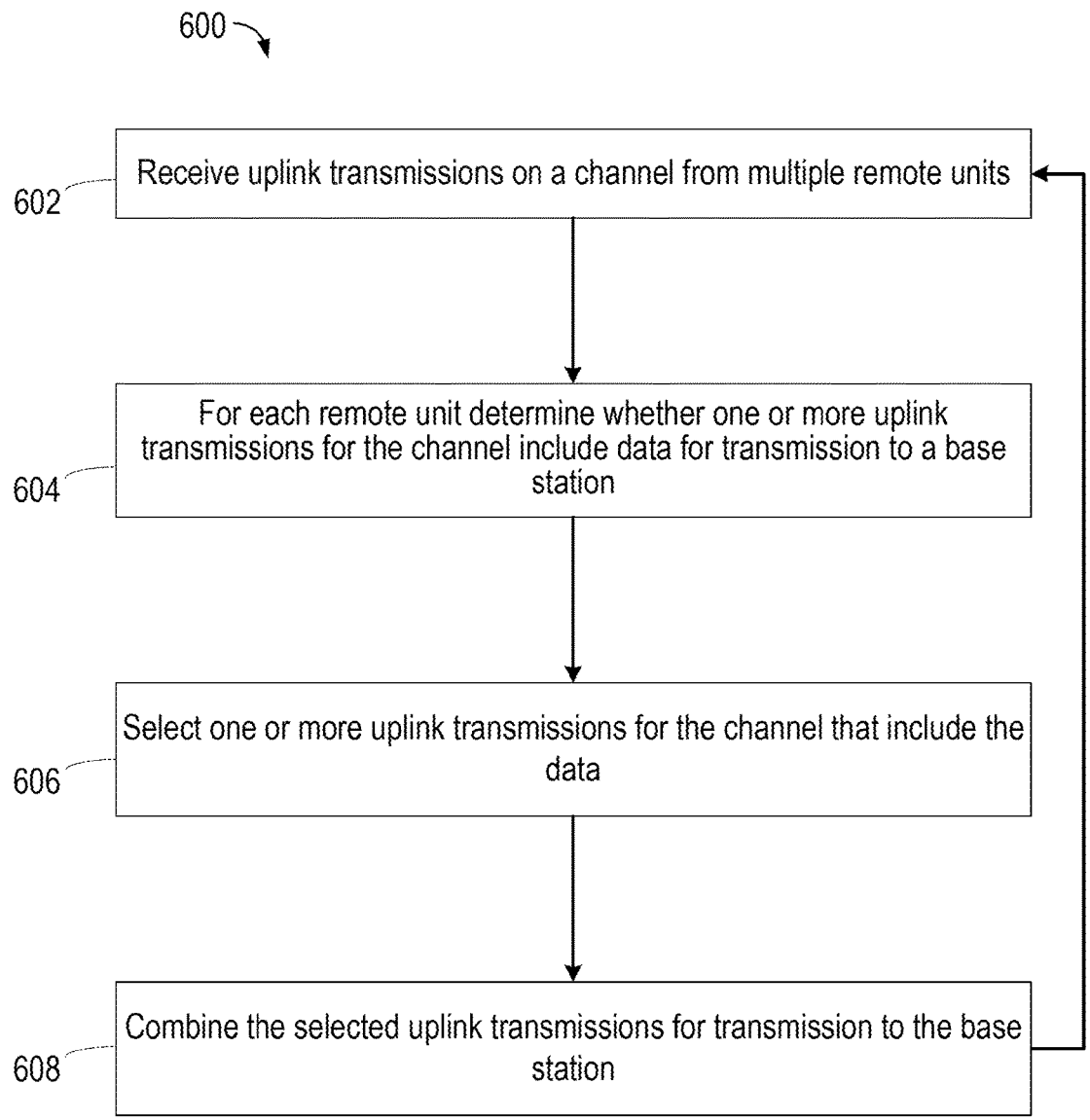
FIG. 6 is a flow chart depicting an example of a process for selectively combining uplink signals in a DAS according to one aspect of the present disclosure.

Any suitable process can be used to selectively combine uplink transmissions. For example, FIG. 6 is a flow chart depicting an example of a process 600 for selectively combining uplink signals in a DAS 102. The process 600 is described with respect to one or more of the aspects and examples described above with respect to FIGS. 1-5. Other implementations, however, are possible.

The process 600 involves receiving uplink transmissions on a channel from multiple remote units, as depicted in block 602. For example, the unit 104 can receive uplink transmissions from the remote units 110a-d as described in one or more of the examples with respect to FIGS. 1-5.

In some aspects, the unit 104 can receive baseband uplink transmissions via a channel used to communicate uplink transmissions between one or more of the remote units 110a-d and the unit 104. The remote units 110a-d can receive uplink signals or other uplink transmissions in an RF band. The remote units 110a-d can extract baseband uplink transmissions from the received uplink RF traffic. For example, the remote units 110a-d can extract baseband uplink transmissions using channel filters and down-converters, as described above with respect to FIG. 4. Each of the remote units 110a-d can transmit the extracted baseband uplink transmissions to the unit 104.

The process 600 also involves determining, for each remote unit, whether the received uplink transmissions for the channel includes data for transmission to a base station, as depicted in block 604. For example, a processor 202 of the unit 104 can execute a selection engine 206. Executing the selection engine 206 can configure the processor 202 to execute one or more algorithms for determining whether the received uplink transmissions for the channel includes data for transmission to a base station 101.

The process 600 also involves selecting the uplink transmissions received from at least some remote units that includes the data for transmission to the base station, as depicted in block 606. For example, a processor 202 of the unit 104 can execute the selection engine 206. Executing the selection engine 206 can configure the processor 202 to execute one or more algorithms for selecting the uplink transmissions from at least some remote units that includes the data for transmission to the base station 101, as described above with respect to FIGS. 2 and 3. In some aspects, selecting the uplink transmissions can involve configuring at least some of the attenuators 210a-d to attenuate non-selected uplink transmissions portions, as described above with respect to FIG. 2. In additional or alternative aspects, selecting an uplink transmissions portion having data can involve selecting bins from an FFT of the uplink transmissions that include data.

In some aspects, the unit 104 can determine whether a portion of uplink transmissions received from a given remote unit for a channel includes data by determining whether the uplink transmissions portion has a signal strength equal to or exceeding a threshold. The threshold signal strength can be stored in the memory 204. The processor 202 can access the threshold signal strength and compare the threshold signal strength to a signal strength for the received portion of uplink transmissions. If the signal strength for the received portion of uplink transmissions is greater than or equal to the threshold signal strength, the selection engine 206 can identify the received portion of uplink transmissions as having data for transmission to the base station 101. If the signal strength for the received portion of uplink transmissions is less than the threshold signal strength, the selection engine 206 can identify the received portion of uplink transmissions as lacking data for transmission to the base station 101.

In some aspects, the unit 104 can determine whether a portion of uplink transmissions received from a given remote unit for a channel includes data by determining whether the uplink transmissions portion includes one or more spreading codes. For example, a base station 101 may be included in a type of telecommunication system (e.g., code division multiple access ("CDMA") systems, Long Term Evolution ("LTE") systems, etc.) that utilizes spreading codes. A list of spreading codes in use by a base station 101 can be provided to a unit 104, the remote units 110a-d, or some combination thereof. Providing the list of spreading codes can allow the selection engine 206 to search for the spreading codes in signals received by the remote units 110a-d or in uplink transmissions received from the remote units 110a-d. The selection engine 206 can select a portion of uplink transmissions for combination based on the portion of uplink transmissions having one or more valid spreading codes. Uplink transmissions without valid spreading codes can be excluded or otherwise omitted from combined uplink signals. In some aspects, a base station 101 can also provide information that can be used to identify frequency channels associated with the spreading codes (e.g., those frequency channels being used with certain spreading codes). The threshold signal strength can be stored in the memory 204. The processor 202 can access the threshold signal strength and compare the threshold signal strength to a signal strength for the received portion of uplink transmissions. If the signal strength for the received portion of uplink transmissions is greater than or equal to the threshold signal strength, the selection engine 206 can identify the received portion of uplink transmissions as having data for transmission to the base station 101. If the signal strength for the received portion of uplink transmissions is less than the threshold signal strength, the selection engine 206 can identify the received portion of uplink transmissions as lacking data for transmission to the base station 101.

In additional or alternative aspects, the selection engine 206 can use scheduling information for GSM and LTE systems to identify portions of uplink transmissions having data for transmission. For example, in LTE systems, uplink frequency and bandwidth can change from frame to frame. A base station 101 can provide scheduling information about active calls to the unit 104, the remote units 110a-d, or some combination thereof. The selection engine 206 can use the scheduling information to track signal strength for a given terminal device that changes the transmission frequency during a call.

In additional or alternative aspects, the geographic location of terminal devices can be used to identify portions of uplink transmissions for inclusion in a combined uplink signal. For example, the selection engine 206 can use proximity detection, location detection, or other suitable processes to determine which of the remote units 110a-d are receiving calls from terminal devices served by a base station 101. The base station 101 can communicate information to the unit 104 that identifies terminal devices that are communicating with the base station 101 via the DAS 102. The information from the base station 101 can allow the unit 104 to determine which of the remote units 110a-d are receiving signals from the terminal devices. The unit 104 can select portions of uplink transmissions from a given subset of remote units based on one or more terminal devices using the subset of remote units. For example, the unit 104 can determine from the received information that remote units 110a, 110b are receiving uplink signals from a first terminal device, that remote units 110b, 110c are receiving uplink signals from a second terminal device, and that remote units 110c, 110d are receiving uplink signals from a third terminal device. Thus, the unit 104 can combine uplink transmissions received from 110a, 110b that is associated with a first channel used by the first terminal device, can combine uplink transmissions received from 110b, 110c that is associated with a second channel used by the second terminal device, and can combine uplink transmissions received from 110c, 110d that is associated with a third channel used by the third terminal device.

The process 600 also involves combining the selected uplink transmissions for transmission to the base station, as depicted in block 608. For example, the unit 104 can combine selected uplink transmissions as described above with respect to FIGS. 1-3.

The process 600 can return to block 602 to perform selective uplink combining for another uplink channel. The process 600 can be performed for any number of channels used to communicate channelized uplink transmissions from the remote units 110a-d to the unit 104.

Any suitable process can be used to exclude or omit uplink transmissions from a combined uplink signal. In one example, the unit 104 can mute or otherwise attenuate digital data received from a remote unit that represents wireless traffic to be excluded. In some aspects, the digital data may be attenuated to a low signal level. In other aspects, the digital data may be discarded. In another non-limiting example, the remote unit can refrain from transmitting digital data that represents wireless traffic to be excluded (e.g., noise that is present on an unused uplink frequency channel).

While the present subject matter has been described in detail with respect to specific aspects and features thereof, it will be appreciated that those skilled in the art, upon attaining an understanding of the foregoing may readily produce alterations to, variations of, and equivalents to such aspects and features. Each of the disclosed aspects, examples, and features can be combined with one or more of the other disclosed aspects, examples, and features. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A unit of a distributed antenna system, the unit comprising:
    circuitry configured to:
        receive first baseband uplink signals from remote units of the distributed antenna system via a first channel;
        receive second baseband uplink signals from the remote units of the distributed antenna system via a second channel;
        generate a first combined uplink signal by combining at least a first portion of the first baseband uplink signals received from a first subset of the remote units via the first channel that includes data for transmission to a base station; and
        generate a second combined uplink signal by combining at least a second portion of the second baseband uplink signals received from a second subset of the remote units via the second channel that includes data for transmission to the base station, wherein the second combined uplink signal is generated in part by at least one of attenuating or excluding at least a third portion of the first baseband uplink signals received from the first subset of the remote units that does not include data for transmission to the base station; and
        transmit the first combined uplink signal and the second combined uplink signal to the base station.

2. The unit of claim 1, wherein the circuitry is further configured to:
    determine that the at least the first portion of the first baseband uplink signals received from the first subset of the remote units via the first channel includes data for transmission to the base station,
    determine that the at least the second portion of the second baseband uplink signals received from the second subset of the remote units via the second channel includes data for transmission to the base station, and
    determine that at least the third portion of the first baseband uplink signals received from the first subset of the remote units lacks data for transmission to the base station.

3. The unit of claim 2, wherein the circuitry is further configured to:
    determine that the at least the first portion includes data for transmission to the base station based on the at least the first portion having a signal strength equal to or exceeding a threshold; and
    determine that the at least the third portion lacks data for transmission to the base station based on the at least the third portion having a signal strength less than the threshold.

4. The unit of claim 2, wherein the circuitry is further configured to:
    receive spreading codes from the base station;
    determine that the at least the first portion includes data for transmission to the base station based on the at least the first portion having at least one of the spreading codes; and
    determine that the at least the third portion lacks data for transmission to the base station based on the at least the third portion not having any spreading codes.

5. The unit of claim 1, wherein the circuitry includes:
    an attenuator configured to attenuate the third portion of the first baseband uplink signals received from the first subset of the remote units that was determined to lack data for transmission to the base station.

6. A distributed antenna system (DAS) comprising:
    a first unit including circuitry;
    a plurality of remote units including circuitry and communicatively coupled to the first unit, wherein the plurality of remote units includes a first subset of remote units and a second subset of remote units, wherein each of the plurality of remote units are configured to:
        receive uplink radio frequency signals including a first radio frequency channel corresponding to a first channel and a second radio frequency channel corresponding to a second channel;
        extract first baseband uplink signals for the first channel from first uplink radio frequency signals in the first radio frequency channel;
        extract second baseband uplink signals for the second channel from second uplink radio frequency signals in the second radio frequency channel; and
        transmit the first baseband uplink signals and the second baseband uplink signals to the first unit within the distributed antenna system; and
    wherein the first unit is configured to:
        generate a first combined uplink signal by combining at least a first portion of the first baseband uplink signals received from the first subset of remote units that includes data for transmission to a base station;
        generate a second combined uplink signal by combining at least a second portion of the second baseband uplink signals received from the second subset of remote units that includes data for transmission to the base station, wherein the second combined uplink signal is generated in part by at least one of attenuating and excluding a third portion of the first baseband uplink signals received from the first subset of remote units that lacks data for transmission to the base station; and
        transmit the first combined uplink signal and the second combined uplink signal to the base station.

7. The system of claim 6, wherein the first unit is further configured to:
    determine that the at least the first portion of the first baseband uplink signals received from the first subset of the remote units via the first channel includes data for transmission to the base station,
    determine that the at least the second portion of the second baseband uplink signals received from the second subset of the remote units via the second channel includes data for transmission to the base station, and
    determine that at least the third portion of the first baseband uplink signals received from the first subset of the remote units lacks data for transmission to the base station.

8. The system of claim 7, wherein the first unit is further configured to:

determine that the at least the first portion includes data for transmission to the base station based on the at least the first portion having a signal strength equal to or exceeding a threshold; and determine that the at least the third portion lacks data for transmission to the base station based on the at least the third portion having a signal strength less than the threshold.

9. The system of claim 7, wherein the first unit is further configured to:

receive spreading codes from the base station;

determine that the at least the first portion includes data for transmission to the base station based on the at least the first portion having at least one of the spreading codes; and determine that the at least the third portion lacks data for transmission to the base station based on the at least the third portion not having any spreading codes.

10. A method comprising:

receiving first baseband uplink signals at a first unit from remote units of a distributed antenna system via a first channel;

receiving second baseband uplink signals at the first unit from the remote units of the distributed antenna system via a second channel;

generating a first combined uplink signal by combining at least a first portion of the first baseband uplink signals received from a first subset of the remote units via the first channel that includes data for transmission to a base station; and generating a second combined uplink signal by combining at least a second portion of the second baseband uplink signals received from a second subset of the remote units via the second channel that includes data for transmission to the base station, wherein the second combined uplink signal is generated in part by at least one of attenuating or excluding at least a third portion of the first baseband uplink signals received from the first subset of the remote units that does not include data for transmission to the base station; and transmitting the first combined uplink signal and the second combined uplink signal to the base station.

11. The method of claim 10, further comprising:

determining that the at least the first portion of the first baseband uplink signals received from the first subset of the remote units via the first channel includes data for transmission to the base station, determining that the at least the second portion of the second baseband uplink signals received from the second subset of the remote units via the second channel includes data for transmission to the base station, and determining that at least the third portion of the first baseband uplink signals received from the first subset of the remote units lacks data for transmission to the base station.

12. The method of claim 11, wherein:

determining that the at least the first portion includes data for transmission to the base station is based on the at least the first portion having a signal strength equal to or exceeding a threshold; and determining that the at least the third portion lacks data for transmission to the base station is based on the at least the third portion having a signal strength less than the threshold.

13. The method of claim 11, further comprising:

receiving spreading codes from the base station;

determining that the at least the first portion includes data for transmission to the base station based on the at least the first portion having at least one of the spreading codes; and determining that the at least the third portion lacks data for transmission to the base station based on the at least the third portion not having any spreading codes.

\* \* \* \* \*